(12) United States Patent
Chapnik et al.

(10) Patent No.: US 6,999,114 B1
(45) Date of Patent: Feb. 14, 2006

(54) ELECTRONIC CAMERA EMPLOYING REFLECTIVE FLAT PANEL DISPLAY FOR VIEWING AND PRINTING IMAGES

(75) Inventors: Philip D Chapnik, Newton, MA (US); Bruce K. Johnson, North Andover, MA (US)

(73) Assignee: Polaroid Corporation, Waltham, MA (US)

( * ) Notice: Subject to any disclaimer, the term of this patent is extended or adjusted under 35 U.S.C. 154(b) by 776 days.

(21) Appl. No.: 09/653,598

(22) Filed: Aug. 31, 2000

Related U.S. Application Data

(60) Provisional application No. 60/151,884, filed on Sep. 1, 1999.

(51) Int. Cl.
*H04N 5/225* (2006.01)

(52) U.S. Cl. .................. 348/207.2; 348/64; 396/30; 396/373; 396/351

(58) Field of Classification Search ............... 396/30, 396/351, 373, 385, 42, 439, 429; 349/1–3; 348/64, 333.1, 333.11, 344, 333.06, 340–341, 348/333.07, 333.08, 374, 335, 207.99, 207.2, 348/333.02, 333.01; 358/501; 355/41; 386/42
See application file for complete search history.

(56) References Cited

U.S. PATENT DOCUMENTS

| | | | |
|---|---|---|---|
| 4,262,301 A | 4/1981 | Erlichman | 358/6 |
| 4,937,676 A | 6/1990 | Finelli et al. | 358/229 |
| 5,032,911 A * | 7/1991 | Takimoto | 358/501 |
| 5,050,001 A | 9/1991 | Hatanaka et al. | 358/302 |
| 5,128,773 A * | 7/1992 | Sato | 386/42 |
| 5,742,373 A | 4/1998 | Alvelda | 349/204 |
| 5,754,305 A | 5/1998 | DeClerck et al. | 358/302 |
| 5,802,413 A * | 9/1998 | Stephenson | 396/429 |
| 5,822,637 A | 10/1998 | Stephenson | 396/429 |
| 5,894,326 A * | 4/1999 | McIntyre et al. | 348/333.06 |
| 5,920,298 A | 7/1999 | McKnight | 345/87 |
| 5,946,031 A * | 8/1999 | Douglas | 348/207.99 |
| 6,205,294 B1 * | 3/2001 | Norris et al. | 396/30 |
| 6,396,565 B1 * | 5/2002 | Yamamoto et al. | 355/41 |

FOREIGN PATENT DOCUMENTS

| | | |
|---|---|---|
| DE | 198 07 303 A 1 | 1/1999 |
| EP | 0 680 192 A2 | 2/1995 |

OTHER PUBLICATIONS

International Search Report on PCT/US00/24011 dated Dec. 7, 2000.
Wright et al., "Die-Sized Displays Enable Microdisplays New Applications" (http://www.ad-tec.com.semiconductor/archive/sep98/lores/feature3.html).
Microdisplay Report: What are Microdisplays? (http://www.mdreport.com/whatis.html).

* cited by examiner

*Primary Examiner*—David L. Ometz
*Assistant Examiner*—Brian Jelinek

(57) ABSTRACT

An electronic camera utilizing a reflective flat panel display for printing and/or viewing images in disclosed herein. One such electronic camera comprises the following components: (a) an electronic image acquisition assembly for capturing an image and converting it into digital information; (b) a reflective liquid crystal microdisplay for producing a reflection image in response to said digital information; and (c) an optical system for directing the reflection image produced by the reflective liquid crystal microdisplay toward, and thereby imagewise exposing, photosensitive imaging film loaded in the camera. An advantage of employing a reflective flat panel display for exposing film in such an electronic camera is that the reflective flat panel display can be used also as a means for viewing or previewing digitally captured images.

4 Claims, 12 Drawing Sheets

ELECTRONIC CAMERA EMPLOYING REFLECTIVE FLAT PANEL DISPLAY FOR VIEWING AND PRINTING IMAGES

REFERENCE TO RELATED APPLICATION

This application claims the benefit of Provisional U.S. Pat. App. Ser. No. 60/151,884, filed Sep. 1, 1999.

FIELD

In general, the present invention relates to reflective flat panel display area array printing, and in particular, to an image capturing device, such as an electronic camera, that employs a reflective flat panel display for both viewing and printing images.

BACKGROUND

Electronic cameras for capturing scene images and then selectively printing the same are known.

U.S. Pat. No. 4,262,301, issued to I. Erlichman on Apr. 14, 1981, discloses an electronic camera wherein scene images are captured by an image sensor and then stored electronically. Hard copies of the stored images are subsequently produced by retrieving such images from storage and then printing the same on an image recordable medium by a printer mechanism.

U.S. Pat. No. 4,937,676, issued to Finelli et al. on Jun. 26, 1990, discloses an electronic imaging system wherein the scene images are captured electronically by an image sensor and stored. An operator can preview the captured images prior to printing by recalling them from memory and displaying the same for viewing on a suitable stationary LCD display.

While the devices described by both Erlichman and Finelli et al provide good results in respect of printed hard copy, both employ printing mechanisms wherein images are printed onto a photosensitive photosensitive film line-by-line, such as, by a scanning exposure of the photosensitive film with a linear array printhead. Although the rate and efficiency at which such printing mechanisms can produce finished hardcopy images is generally adequate for printing images of comparatively moderate amounts of digital information, the current development of electronic cameras shows an escalation toward the capture of more digital information per image. With larger, more finely resolved images, the use of linear array printing can present challenging issues in respect of throughput, energy efficiency, and film handling.

As an alternative to linear array printing, one can image a photosensitive film using so-called area array printing technology. Such technology has already found applications in digital camera. Printing in these instances is accomplished by exposing photosensitive film to an image-bearing light propagated from a transmission-type liquid crystal display panel, such panels already being customarily used in digital cameras as preview panels.

For example, U.S. Pat. No. 5,894,326, issued to McIntyre et al. on Apr. 13, 1999, discloses an electronic camera having a printer wherein electronically stored images can be previewed before printing hard copies thereof through the utilization of a display that is selectively movable between an operator view position and an print position. U.S. Pat. No. 5,802,413, issued to S. W. Stephenson on Sep. 1, 1998, describes a system wherein an external electronic viewfinder of an electronic still camera is placed in a holder in relationship to a photographic printer that has a shutter mechanism. Other patents that suggest the use of transmission liquid crystal displays for area array printing include: U.S. Pat. No. 5,050,001, issued to Hatanaka et al. on Sep. 17, 1991; U.S. Pat. No. 5,822,637, issued to Stephenson et al. on Oct. 13, 1998; U.S. Pat. No. 5,894,326, issued to McIntyre et al. on Apr. 13, 1999; and U.S. Pat. No. 5,754,305, issued to DeClerck et al. on May 19, 1998.

Depending on one's particular application, the hard copy obtainable from transmission-type LCD print mechanisms may be suitable. However, due in part to the comparatively low "fill factor" (i.e., the ratio of image and non-image surface areas) of the typical transmission-type LCDs employed in digital camera displays, the resolution of such images is generally low and typically does not approach acceptable photographic quality. Further, in many such images, a noticeable "screen door" effect can be observed (i.e., a grid-like pattern of un-imaged areas). While the "screen door" effect can be mitigated, for example, by jostling either the photosensitive film or LCD during exposure, the resultant blurring reduces resolution and hence may still not produce a desirable image. In light of the above, there is need for a methodology of printing images instantly from a digital camera (or other imaging device) that is both comparatively fast and provides comparatively good image quality. And, in this regard, there is no known apparatus or system in which displayed images can be viewed in one mode by a first optical system and through a second optical system be printed in another mode through an optical system which can selectively redirect images, real or virtual, to at least either one or both of the optical systems.

SUMMARY

In response to the above need, the present invention provides an electronic imaging device, such as an electronic camera, incorporating means to record images onto photosensitive film by an area-wise exposure of image-carrying illumination reflected off a reflective flat panel display. Further, it has been found that, by using either twisted nematic (TN) or super-twisted nematic (STN) liquid crystal display as the flat panel display, instant images having good contrast and good resolution can be obtained. And further still, in addition to its use in exposing film, the reflective flat panel display can also be used, if desired, for reviewing and/or previewing digitally captured images.

In respect of devices that employ a reflective flat panel display device principally for photographic exposure, several embodiments are contemplated. In general, however, such devices will comprise a camera housing; an objective lens for admitting image-carrying light rays into said camera housing; an electronic image acquisition assembly capable of receiving said image-carrying light rays and converting said image-carrying light rays into image-encoding digital information; a reflective flat panel display capable of being electronically addressed, in response to said image-encoding digital information, to provide in reflected light a reflection image; a receptacle for holding a photosensitive imaging medium; and an optical system capable of directing the reflection image reflected off said reflective flat panel display toward said receptacle for the image-wise area exposure of a photosensitive imaging medium held therein.

In respect of devices that employ a reflective flat panel display for both printing and viewing, several embodiments are contemplated. In general, however, such embodiments will comprise a housing; means for receiving and transmitting electronic image-encoding digital information; a reflective flat panel display capable of being electronically addressed, in response to said electronic image-encoding digital information, to provide in reflected light a reflection image; a reflection image viewer; a receptacle for holding a photosensitive imaging medium; and an optical system capable of selectively directing the reflection image reflected off said reflective flat panel display toward either (a) said receptacle for the image-wise area exposure of a photosensitive imaging medium held therein, or (b) said reflection image viewer for the viewing thereof by a user of the device.

Finally, in respect of the innovation of using a reflective liquid crystal display for photographic printing in itself, the present invention contemplates a methodology having several modes of practice. In general, however, the methodology comprises the steps of: (a) providing a photosensitive medium; (b) providing a reflective liquid crystal display capable of being electronically addressed to provide in reflected light a reflection image, said reflective liquid crystal display being either a twisted nematic or super twisted nematic liquid crystal display; (c) electronically addressing said reflective liquid crystal display contemporaneously with the illumination thereof by a light source to produce a reflection image in reflected light; and (d) directing said reflected light onto said photosensitive medium for the recordation therein of said reflection image.

In light of the above, it is a principal objective of the present invention to provide innovative applications for the area array exposure of photosensitive film by use of a reflective flat panel display.

It is another objective of the present invention to provide for an improved printer-viewer system which is especially versatile in terms of facilitating viewing and/or printing.

It is an other objective of the present invention to provide for an improved printer-viewer system which is simplified in construction and assembly and particularly adapted for incorporation in or combination with an electronic still camera wherein electronically captured images are displayed on a spatial light modulator and printed on an image recordable material.

It is an other objective of the present invention to provide for an improved printer-viewer system and method in which the spatial light modulator is an electronic viewfinder and the image recordable material is photosensitive film.

The above and other objectives and scope of the present invention can be further appreciated in view of the detailed description herein taken in conjunction with the accompanying drawings. In the drawings, like reference numerals indicate like structure throughout the several views.

DETAILED DESCRIPTION

Figure 1:
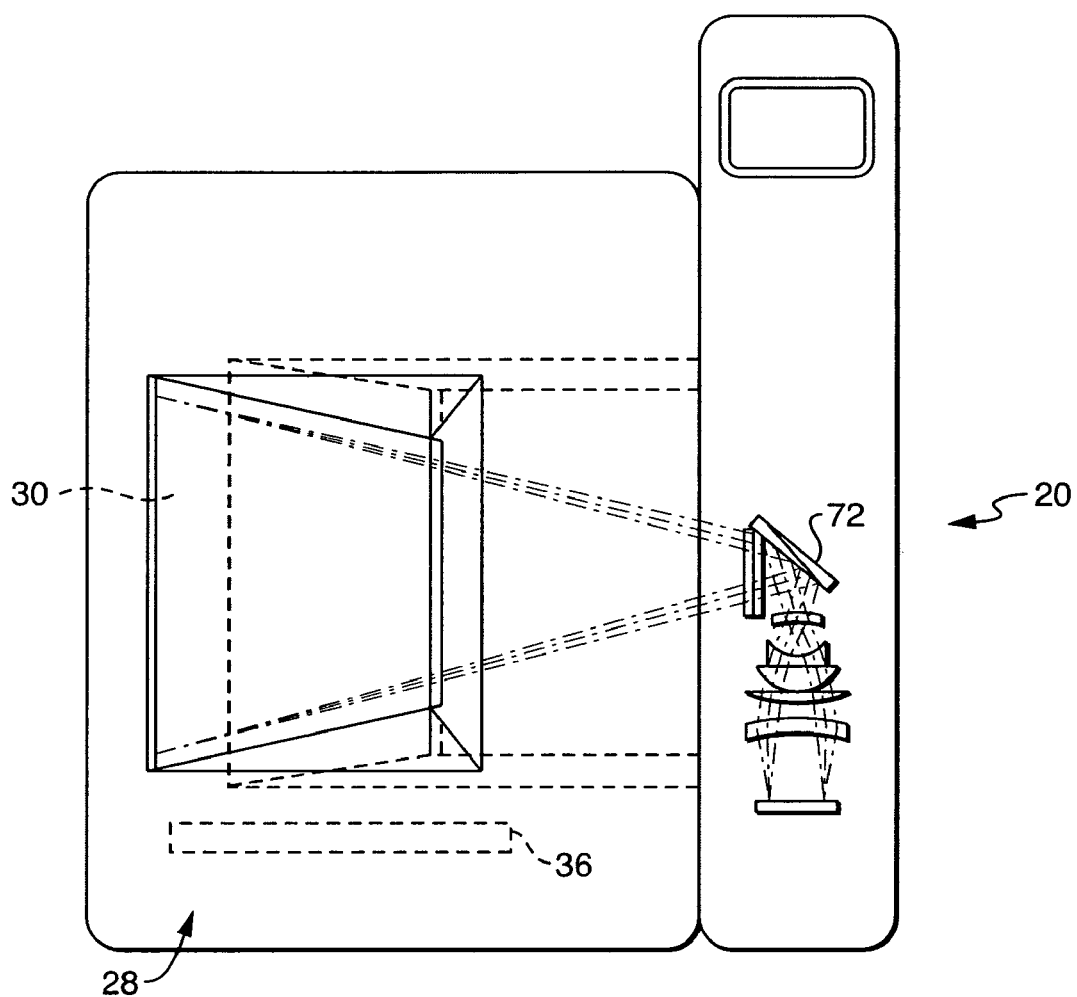
FIG. 1 is an elevational schematic view of an electronic still camera incorporating therein, in accordance with an embodiment of the present invention, a dual-mode printer-viewer system 20. As shown, the dual-mode printer-viewer system 20 is in its printing mode of operation.

In accordance with the present invention, it has been found that good quality images can be recorded onto a photosensitive medium (e.g., conventional 35 mm silver halide emulsion film, self-developing diffusion transfer film, and the like) by using a reflective twisted (or super-twisted) nematic liquid crystal display. The liquid crystal display is used in reflection to provide an imagewise area exposure of said photsensitive medium.

More particularly, the reflective liquid crystal display is electronically addressed, contemporaneously with the illumination thereof by a light source, to produce a reflection image in reflected light. Optical components (such as mirrors, lens, prisms, beamsplitters, and the like) are then used to direct the image-bearing illumination reflected off the liquid crystal display onto the photosensitive medium, thereby effecting the latent recordation of said reflection image.

The invention of using liquid crystal displays for area array imagewise exposure is particularly well-suited for incorporation into or combination with an electronic camera. Such electronic camera will comprise a camera housing, an objective lens for admitting image-carrying light rays into the camera housing, and an electronic image acquisition assembly. As used herein, an electronic image acquisition assembly is an assembly capable of receiving image-carrying light rays and converting that light into image-encoding digital information.

Included within the inventive electronic camera are the components used in producing a hardcopy image from the image-encoding digital information obtained from the electronic image acquisition assembly. These components include, but are not limited to, a receptacle for holding a photosensitive imaging medium, a reflective flat panel display, and an optical system. The reflective flat panel display is one capable of being electronically addressed, in response to image-encoding digital information, to provide in reflected light a reflection image. The optical system is one capable of directing the reflection image reflected off said reflective flat panel display toward said receptacle for the imagewise area exposure of a photosensitive imaging medium held therein.

In the preferred modes of practicing the present invention, and particularly in connection with electronic cameras, the reflective liquid crystal display is a so-called reflective liquid crystal microdisplay, as is disclosed, for example, in U.S. Pat. No. 5,920,298, issued to Douglas McKnight on Jul. 6, 1999; U.S. Pat. No. 6,005,649, issued to Krusius et al. on Dec. 21, 1999; and U.S. Pat. No. 5,742,373, issued to Philip Alvelda on Apr. 21, 1998. In general, microdisplays are high-resolution, full-color, low-power, low-cost displays that are fabricated on an integrated circuit and range in size from a few millimeters to as much as 30 mm and range in resolution from quarter-VGA (VGA being 640×480 pixels) to UXGA (1600×1200 pixels). Because they are reflective and are not direct view displays, they are able to produce, with optics, an image much larger than the physical size of the display. This feature is particularly advantageous in reducing the bulk of a host imaging device.

Figure 16:
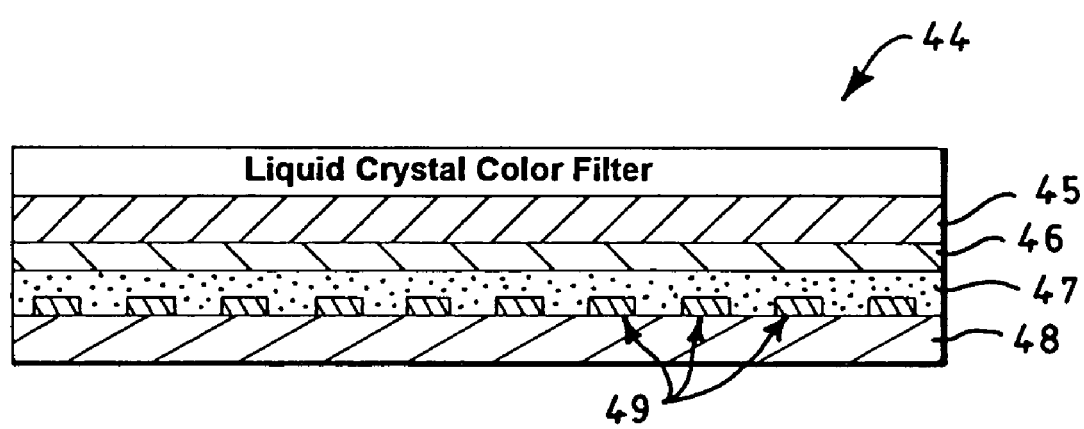
FIG. 16 schematically illustrates an exemplary reflective liquid crystal microdisplay that can be used in practice of certain embodiments of the present invention.

Reflective microdisplays use an external light source and modulate the light as it reflects off the microdisplay. While the present invention is not limited to any particular light source for the illumination of the reflective flat panel display, the light source is preferably a light-emitting diode (LED). For full color imaging, light-emitting diodes for each of the primary color components of white light (i.e., red, green, and blue) can be used. While the structure of microdisplays is subject to much variation, an exemplary microdisplay structure is depicted for illustrative purposes in FIG. 16. The microdisplay 44 shown in FIG. 16 comprises an electrooptic layer 47 disposed between a first substrate 45 and a second substrate 48. The first substrate has a single electrode known as a common electrode 46. Second substrate 48 has a plurality of pixel electrodes 49, each of which periodically acquires updated image data in an independent manner. Each pixel electrode 49 retains the image data acquired for a given period of time or duration, after which the acquired image date is replaced with new image data. At least one of first substrate 45 and second substrate 48 is transparent or translucent to light, with the other substrate or another layer (not shown) being light reflective. Preferably, substrate 48 is the light reflective substrate. According to one embodiment of the invention, electrooptic layer 47 comprises liquid crystal material. The liquid crystal color filter shown in FIG. 16 is employed for producing full color images according to techniques well-known in the art.

Microdisplays can be commercially obtained, for example, from: Colorado MicroDisplay, Inc., of Boulder, Colo., under the product designations CMD3X2A, CMD8X6D, and CMD8X6P; Three-Five Systems, Inc., of Tempe, Ariz., under the LCoS™ trade designation; and the MircroDisplay Corporation of Berkeley, Calif., under the product designations MD640, MD800, and MD1024.

Displaytech, Inc., of Longmont, Colo., currently manufactures a ferroelectric liquid crystal microdisplay under the trade designation, RGB Fastfilter. The RGB Fastfilter is an example of a dye absorption filter constructed with fast-switching ferroelectric liquid crystal (FLC) cells. These cells have switching speeds that greatly exceed those of the more common nematic liquid crystals. However, the molecular switching actions of ferroelectric liquid crystals—unlike nematic liquid crystals—is not voltage dependent and thus provides only bistable states. Accordingly, displays employing ferroelectric liquid crystals may have comparatively lower attainable grey levels, and to that extent, would not be particularly desirable for use in a digital camera.

As another alternative to liquid crystal based reflective microdisplays, microdisplays based on so-called microelectrical mechanical systems (MEMS) may also be used for certain embodiments of the present invention. MEMS microdisplays are essentially displays that contain tiny moveable parts that respond to control voltages. The digital micromirror is the most common of these. This structure contains a control matrix above which are fabricated the display's array of tiny mirrors. Control signals "flip" the mirror from an "on" position, so light is collected, to an "off" position, where light is absorbed. Further details of MEMS display technology are available in the public literature.

In light of the above, it will be apparent to those skilled in the art that the invention is subject to broad application in both stand-alone printers and in electronic cameras. In respect of use in electronic cameras, it will be appreciated that one of the advantages of employing a reflective flat panel display for printing is that—with suitable optical components—the reflective flat panel display can be used in another mode for viewing images. In particular, the reflective flat panel display can be used in a dual-mode printer-viewer system combinable with or otherwise integrated into an electronic camera, or like imaging device. Given the desirability of such products, several particular embodiments have been developed.

Figure 2:
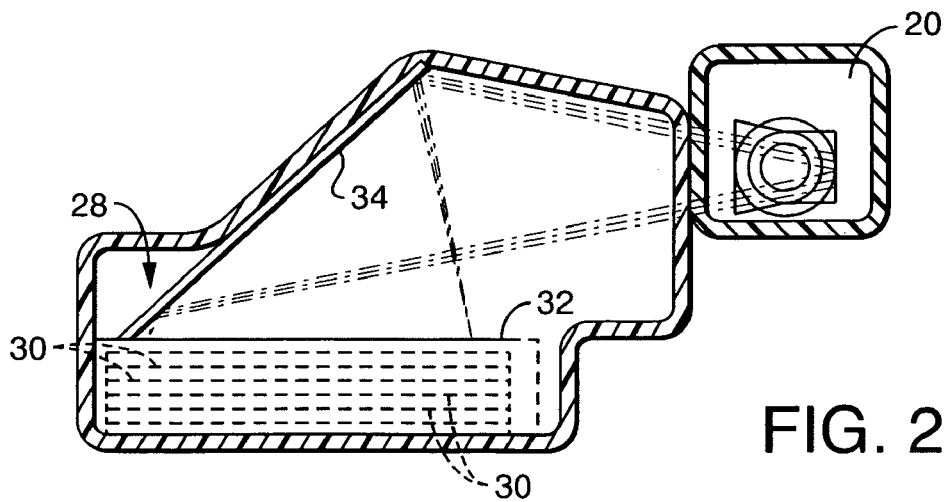
FIG. 2 is a schematic plan view of the electronic still camera illustrated in FIG. 1.
Figure 3:
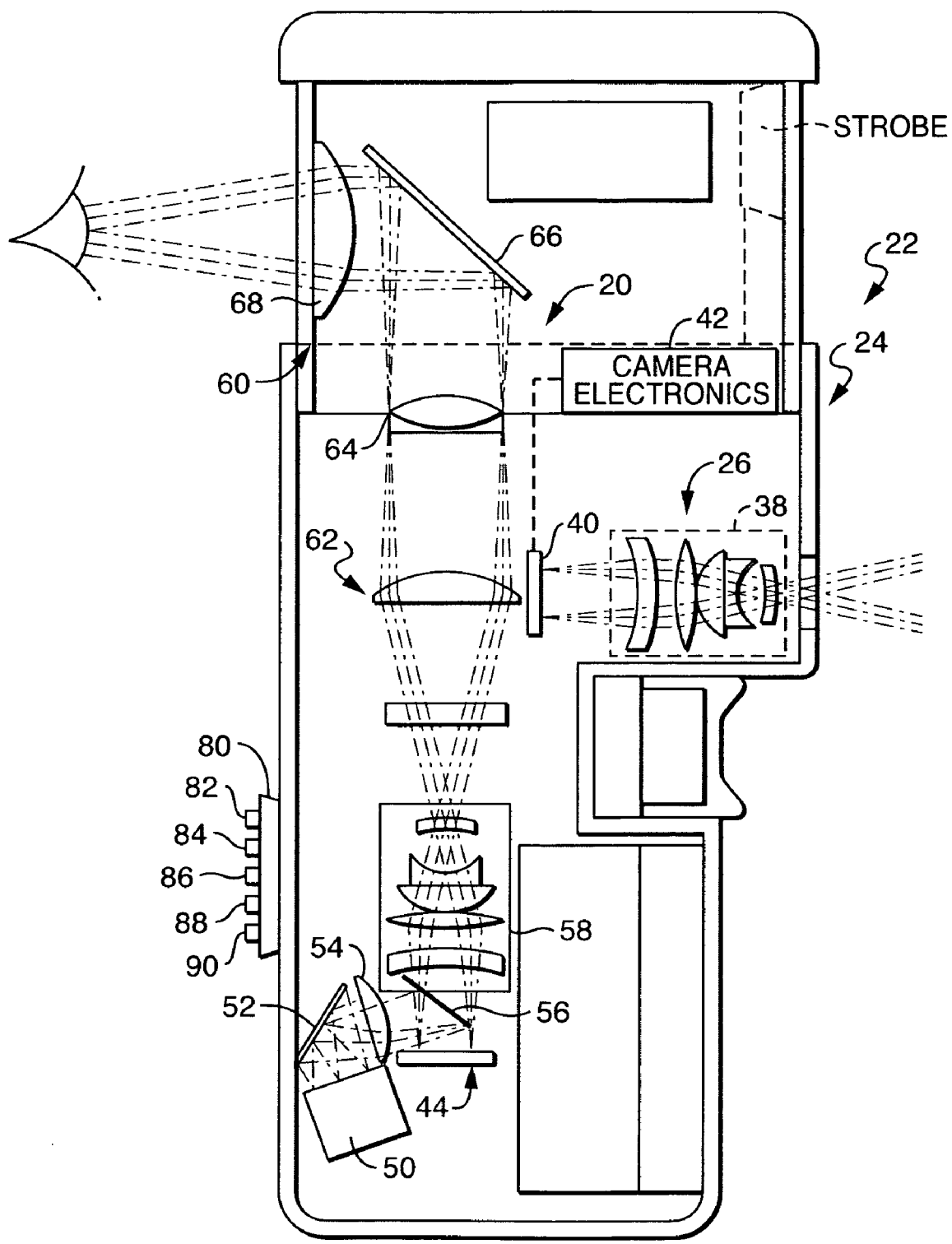
FIG. 3 is a schematic side view of the electronic still camera of FIG. 1, with the dual-mode printer-viewer system 20 placed in its viewing mode of operation.

Reference is initially made to FIGS. 1 to 3 for illustrating one preferred embodiment of a printer-viewer system 20 made according to the principles of the present invention. The printer-viewer system 20 of this embodiment is particularly adapted for use in a conventional electronic still camera 22 for selectively viewing and/or printing images captured and generated by the electronic camera. The electronic camera 22 is operated for electronically capturing, viewing, and/or printing images on an image recordable material; such as self-developing film, whereby the ability to review captured images is provided as well as previewing the images to be printed.

The electronic camera 22 includes a compact housing assembly 24 that houses an electronic image acquisition assembly 26, the printer-viewer system 20, and a film storage and processing unit 28 for storing and processing in a light-tight compartment, a stack of image recordable units 30. In this embodiment, the units 30 are of the photosensitive type, such as of the self-developing kind, commercially available from Polaroid Corporation, Cambridge, Mass., USA. The units 30 are housed in a known cassette structure 32 and the processing unit, preferably, includes a reflecting mirror 34 for directing projected captured images to a focal plane at which the topmost unit of the stack. In this regard, the cassette structure 32 is known and individual ones of the units 30 following exposure can be processed for viewing of the developed latent image by passing through a pair of processing rollers 36 which rollers also assist in ejecting each film unit from an exit slot (not shown). Other image recording materials are contemplated, such a roll of photographic silver halide emulsion film of the non-self-developing type that is sequentially indexed for successive exposures. The present invention contemplates that the image recordable units can comprise solid-state imagers, such as CCD and CMOS sensors instead of imageable media. It will be understood that the images can be recorded by any suitable means.

Reference is made to FIG. 3 for illustrating an electronic image acquisition assembly 26 of the camera 22. The assembly 26 includes a taking lens system 38, that can be of the zoom type for directing and focusing scene images to an image sensor 40, such as an area CCD of the full frame or interline type. The images captured by the image sensor 40 are converted to digital image signals representative of the images captured and are transmitted to camera electronics 42 as is well understood in the field. A captured image display apparatus 44 is part of the printer-viewer system 20 and receives the images from the camera electronics 42 to display a static image captured from the image sensor 40. The present invention contemplates that a video camera acquisition module instead of an electronic still image acquisition module can be used along with a display that displays the images dynamically. In this embodiment, the captured image display device has its exposures taken by a known exposure system forming part of the camera electronics 42. In such a situation, the exposure occurs following display of the images by the image display apparatus 44; as will be described in more detail. In the illustrated embodiment, the image display apparatus 44 is an active matrix area liquid crystal display of the reflective type; such as is commercially available from Colorado MicroDisplay, Inc., Boulder, Colo., USA. It will be appreciated that the display apparatus can be a spatial light modulator.

While an image display apparatus 44 of the latter type is preferred, it is clearly within the spirit and scope of the present invention that the printer is accepting of optical images such as transparencies or a variety of electronically captured images from digital storage devices, such as PCMCIA cards, EEPROM memory; FLASH memory; RAM memory; dynamic RAM memory; magnetic memory; and optical memory. In addition, the printer can accept and display digital image information that is transferred directly from a variety of other sources, such as computers (not shown) through appropriate interface cables (not shown) or by means of radio frequency (RF). In the broader sense, the invention can include other spatial light modulators; such as digital microdisplays (DMD's). Whatever image display device is used, however, it will be appreciated that suitable image buffer(s) and A/D convertor(s) (not shown) would be used, as well as devices operable for retrievably transferring the images in predetermined fashions to the printer.

Continued reference is made to FIG. 3 for purposes of illustrating the display apparatus 44 in combination with an additional source of illumination 50 along with a mirror 52, and condenser lens 54 for compactly providing supplemental illumination for the displayed image on the display apparatus 44. Additional provision is a made for a polarized beam splitter 56 that has a polarity opposite to that contained in the display apparatus 44 for facilitating printing of the images on the film plane.

Provision is made for a suitable optical projection lens system 58 that transmits, preferably, in a telecentric manner, the displayed images to an optical viewing system 60. In this embodiment, the optical viewing system includes a field lens 62, refocusing lens 64, mirror 66 and eyelens 68. Other optical viewing systems can be used in this arrangement to provide for a variety of optical functions.

An optical coupling system 70 (FIGS. 1 and 2) is disclosed in this embodiment, which includes a mirror 72 that is motor driven about an axis which motor is under the control of a microprocessor in the camera electronics between viewing and printing modes. In an operator viewing mode, the mirror 72 is rotated out of the optical path of the projection lens system, whereby real or virtual images are directed to the optical viewing system for viewing by a user. In the printing mode, the mirror 72 is rotated into the optical path for redirecting the displayed virtual or real images from the projection system to the optical viewing system. Although a mirror is disclosed, the present invention also contemplates a beamsplitter to redirect such displayed images simultaneously to the film plane for printing and to the eyelens for viewing.

The electronic camera is provided with a user interface 80, schematically depicted, and includes several operator control buttons 82 to 90 each of which are independently operated. The interface and buttons are connected to a microprocessor in the camera electronics control 42 and are accessible to user on a surface of the housing assembly. A control button 82 allows for actuation of an electronic image capturing exposure; control button 84 is operable for allowing reviewing of the captured image on the micro-display 44; control buttons 86, 88 are independently operable, for example, in order to browse backwards and forwards through stored images retained by the memory so that preselected ones of the stored images are displayed on the display apparatus 44 for printing purposes. Control button 90 is connected to the microprocessor and the microdisplay to allow printing of the selected image(s). If desired, a plurality of prints can be obtained, however, for each print the film assemblage is to be operated as to be described in order to advance successive ones of the film units. The user interface can include a wide variety of controls for controlling the various functions associated with the operation of the system. Although not shown the user interface can include a display that is operable for indicating the image selected from the card to correspond to the image selected by the operator.

Figure 4:
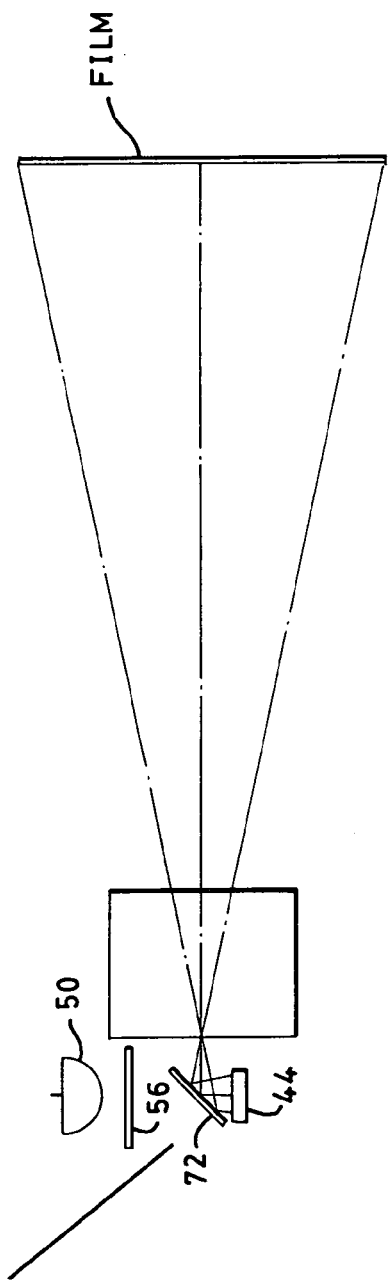
FIGS. 4 to 8 each represent different schematic versions of printer-viewer systems according to the present invention.
Figure 5:
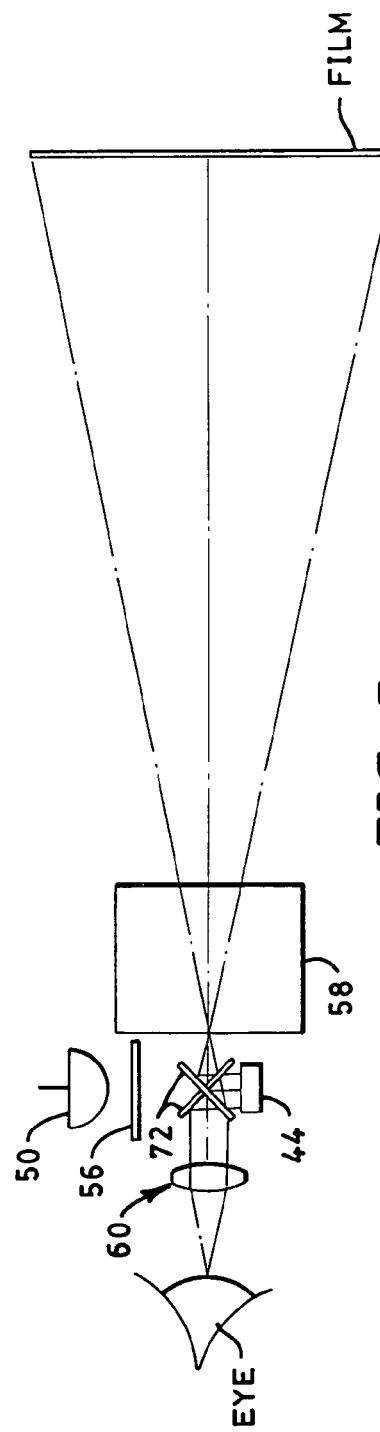
Figure 6:
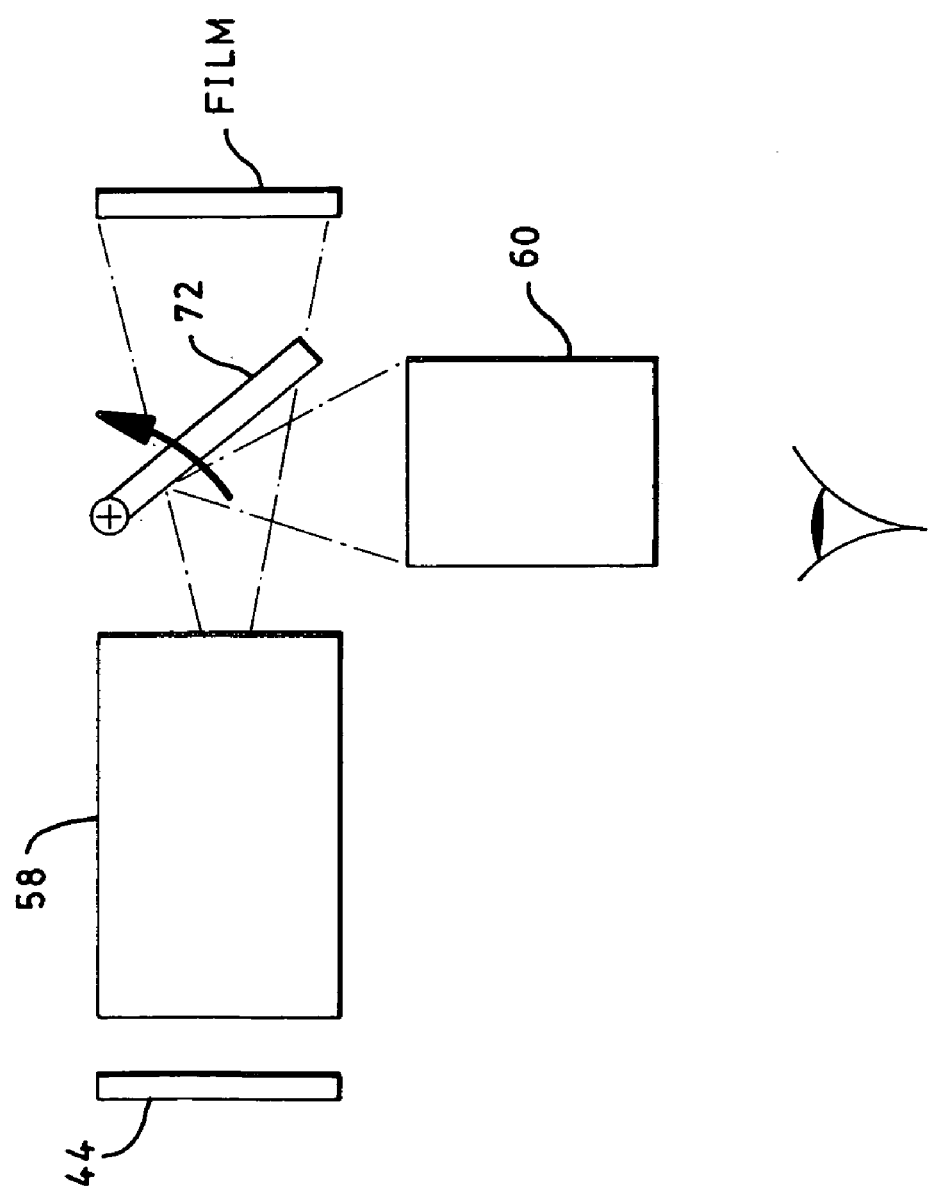

FIGS. 4 and 5 illustrate another configuration of the operative components of a viewer-printer device of the present embodiment in the printing and viewing modes; respectively. Structure of this embodiment like that above will be represented by the same reference numerals. The display apparatus 44, optical coupling device 72, projection and optical viewing lens systems 58 and 60 have the configuration illustrated. FIG. 6 illustrates another embodiment of the present invention pertaining to a different orientation of the viewing and projecting lens systems 58 and 60 which is more compact than those earlier described.

Figure 7:
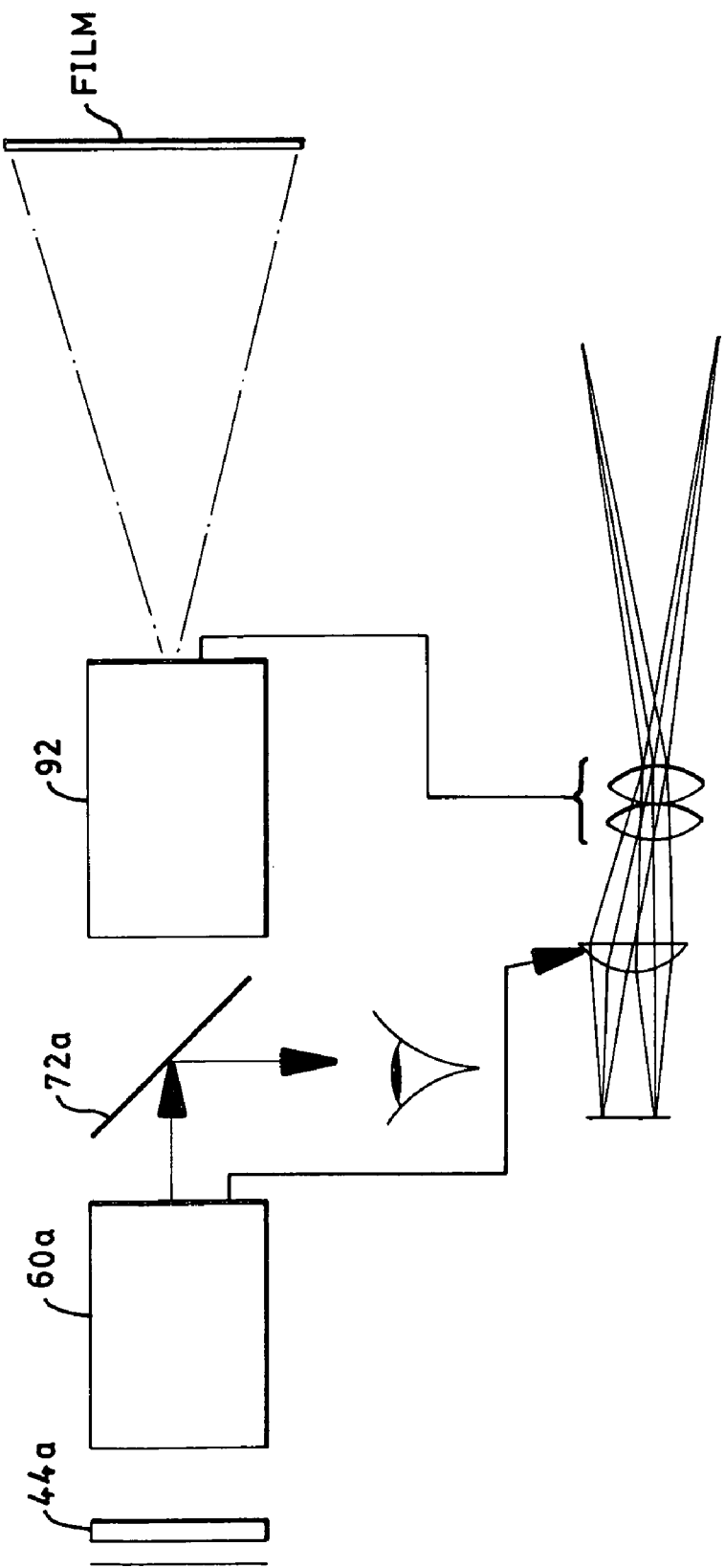
Figure 8:
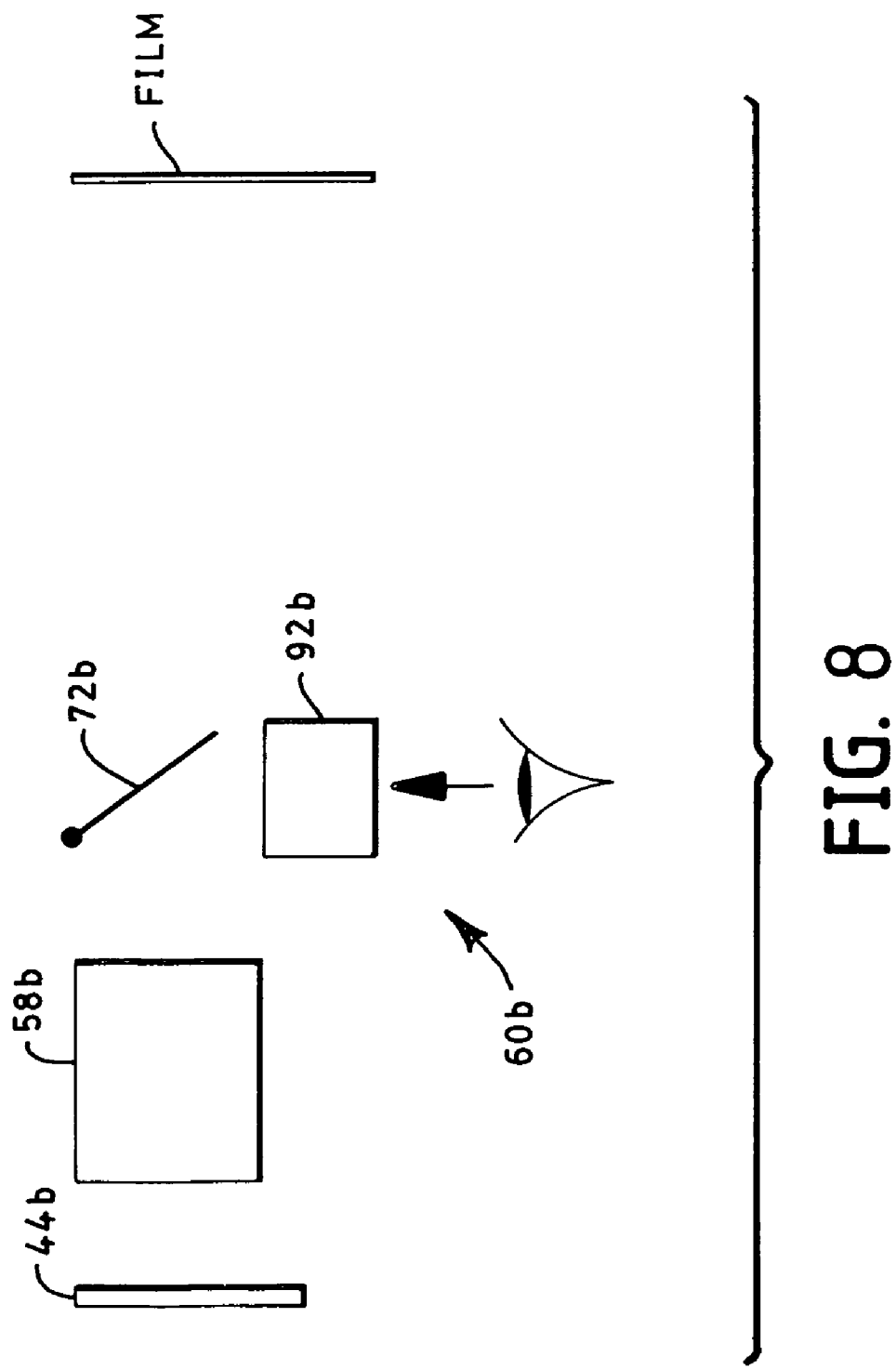

FIGS. 7 and 8 depict still further embodiments consistent with the spirit and scope of the present invention.

In the FIG. 7 embodiment, an optical viewing assembly is provided with a display apparatus 44a having in optical communication therewith a viewing optical lens system 60a which directs the displayed virtual or real image to a mirror 72a and then to an viewer. If the system is to be used in the projection mode, the mirror 72a is suitably moved out of optical communication with the viewing optical lens system 60a, whereby the latter is in optical communication with a supplemental lens system 92. The supplemental lens system 92 in combination with the with optical lens system form in effect a projection lens system 94 for projecting the displayed captured image to, for example, the film plane.

In FIG. 8 provision is made for yet another embodiment, wherein a projection lens system 58b is disposed immediately in front of the display apparatus 44b for projecting the displayed captured image instead of the optical viewing assembly 60a as in the last embodiment. In this latter case, the optical mirror 72b is positioned out of the path of the light rays which are projected to the film plane. If the viewing mode is selected, the mirror 72b is moved into optical communication with the display apparatus 44b, whereby the former directs the real or virtual images to the supplemental lens system 92b to thereby form an optical viewing lens system 60b.

Figure 9:
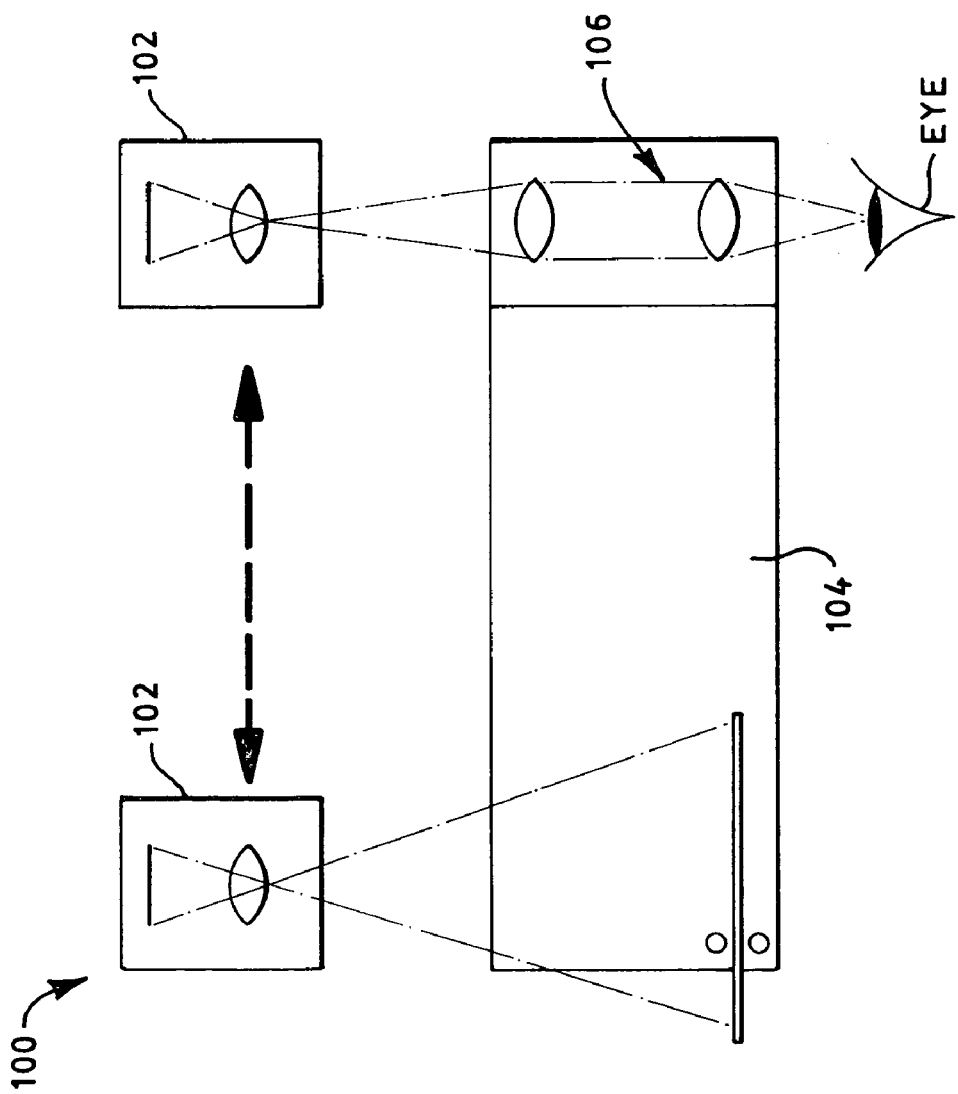
FIG. 9 is a schematic view of another embodiment of the present invention.

FIG. 9 represents yet another embodiment of the present invention in which provision is made for a sliding projecting printer system that is movable between printing and viewing positions. In this embodiment, the viewer-printer includes a printing module 102 containing, for instance, a light source, a spatial light modulator, condenser lens and a projecting lens system. The foregoing printing module 102 is operable for projecting an image through an aperture, not shown, onto a photographic film, preferably of the self-developing type housed in an otherwise light-tight enclosure. A suitable shuttering mechanism, also not shown, selectively controls the light entering the film/processor module 104 for printing operation. The film/processor module 104 contains for instance a pair of film processing rollers that effect processing of the image film unit. For effecting a viewing mode, the printer module 102 is moved to a position, whereat it is in optical communication with a viewfinder optic system 106 such that an image that is displayed by the spatial light modulator is viewable by an operator. It is understood, of course, that the printing aperture for the film when the printing module is in the printing position is closed. Moreover the printing module can be moved manually or under motor control.

Figure 11:
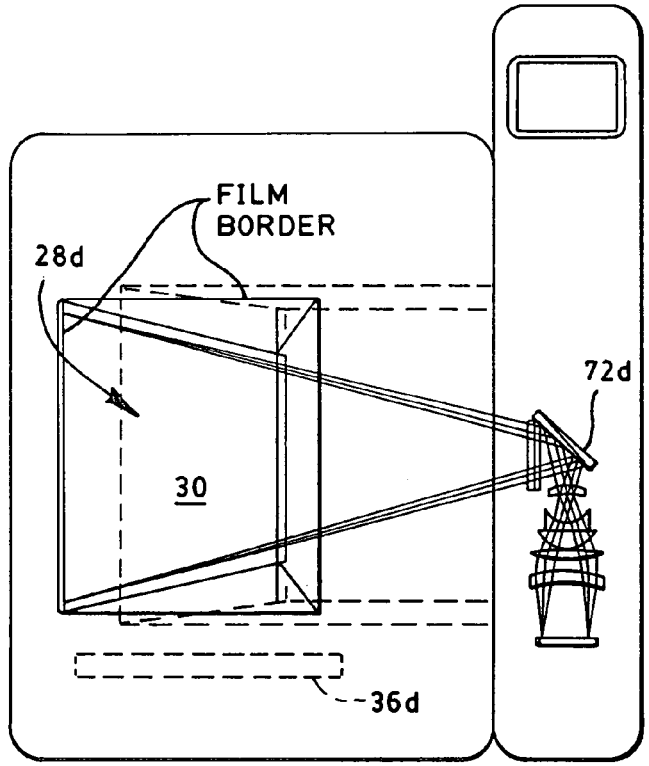
FIGS. 10 to 12 are schematic views of another version of the printer-viewer system in a printing mode.
Figure 10:
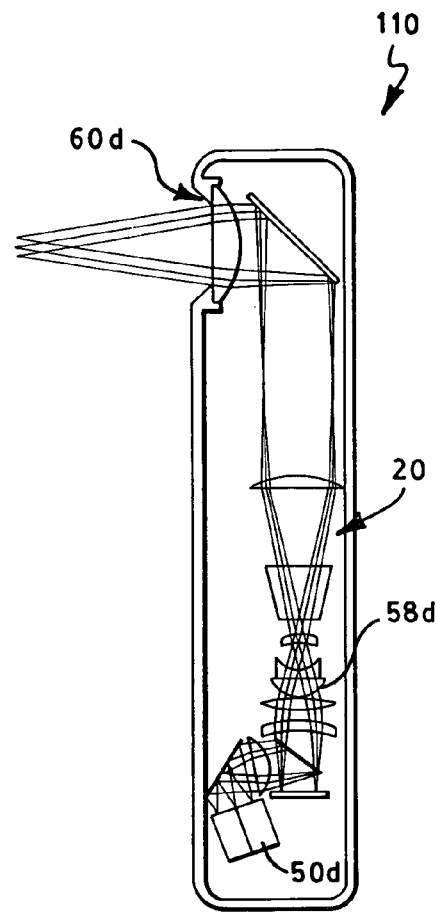
Figure 12:
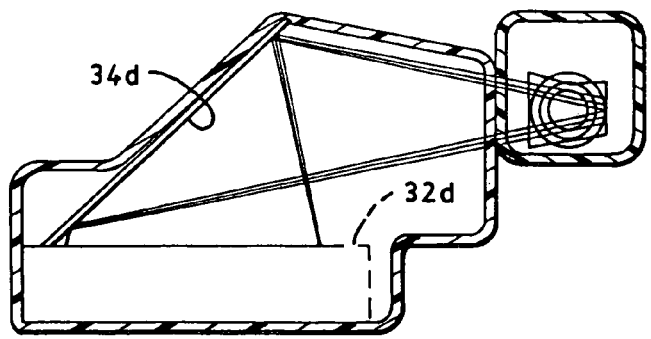

FIGS. 10 to 12 illustrate yet another embodiment, wherein there is provided a viewer-printer apparatus 110. This embodiment is similar to that described in FIGS. 1 to 3, and similar structure have the same reference numeral with however the addition of a suffix "d". In this embodiment, the viewer-printer apparatus is neither permanently attached to nor incorporated in a camera, thus allowing a user to select among cameras with different sized film backs depending on the user's needs and the size of the film format.

Refocus could be accomplished by incorporating a weak correction lens at the entrance to the printing unit. If the connection is to be of a couplable or fixed nature, the refocusing of the projection lens can be accomplished by mating features on the two modules. A lens disk (not shown) can be operatively mounted with respect to the projection system and can be automatically moved into place. A manual system could is also envisioned for moving such a lens disk.

Figure 13:
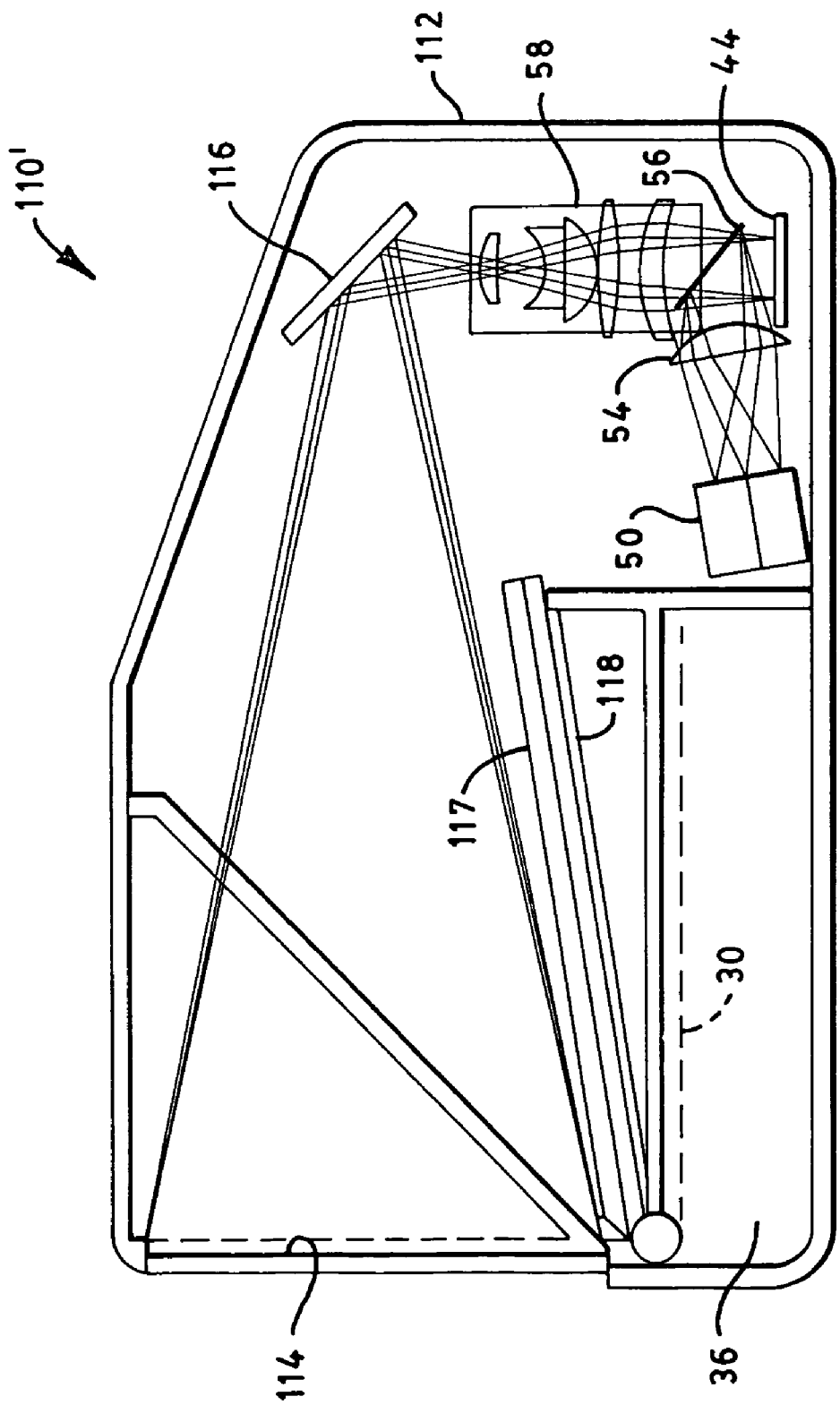
FIG. 13 illustrates another embodiment of invention, i.e., a printer-projector system, shown in its viewing mode of operation.
Figure 14:
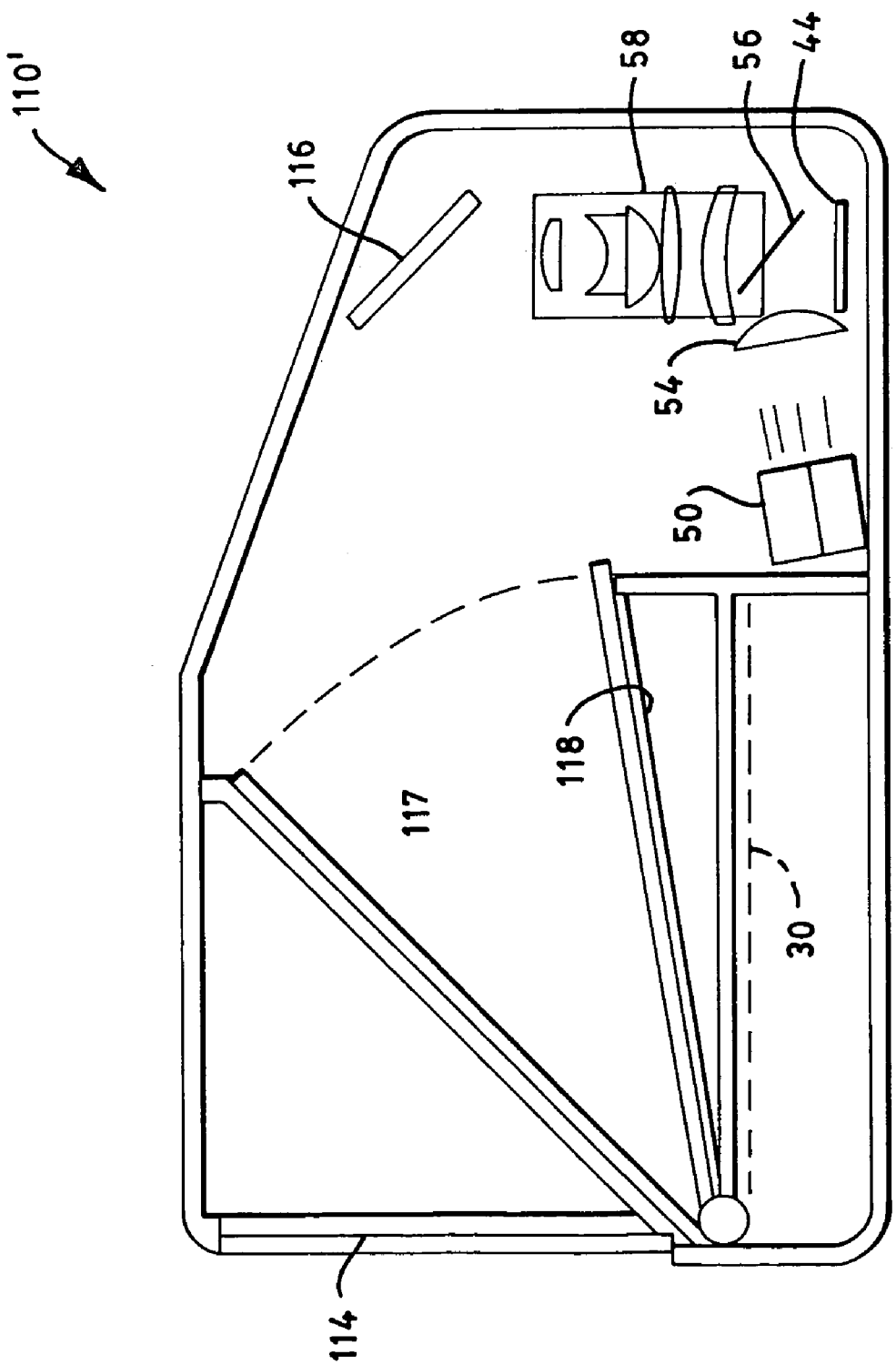
FIG. 14 illustrates the printer-projector system of FIG. 13 in an intermediate stage of operation.
Figure 15:
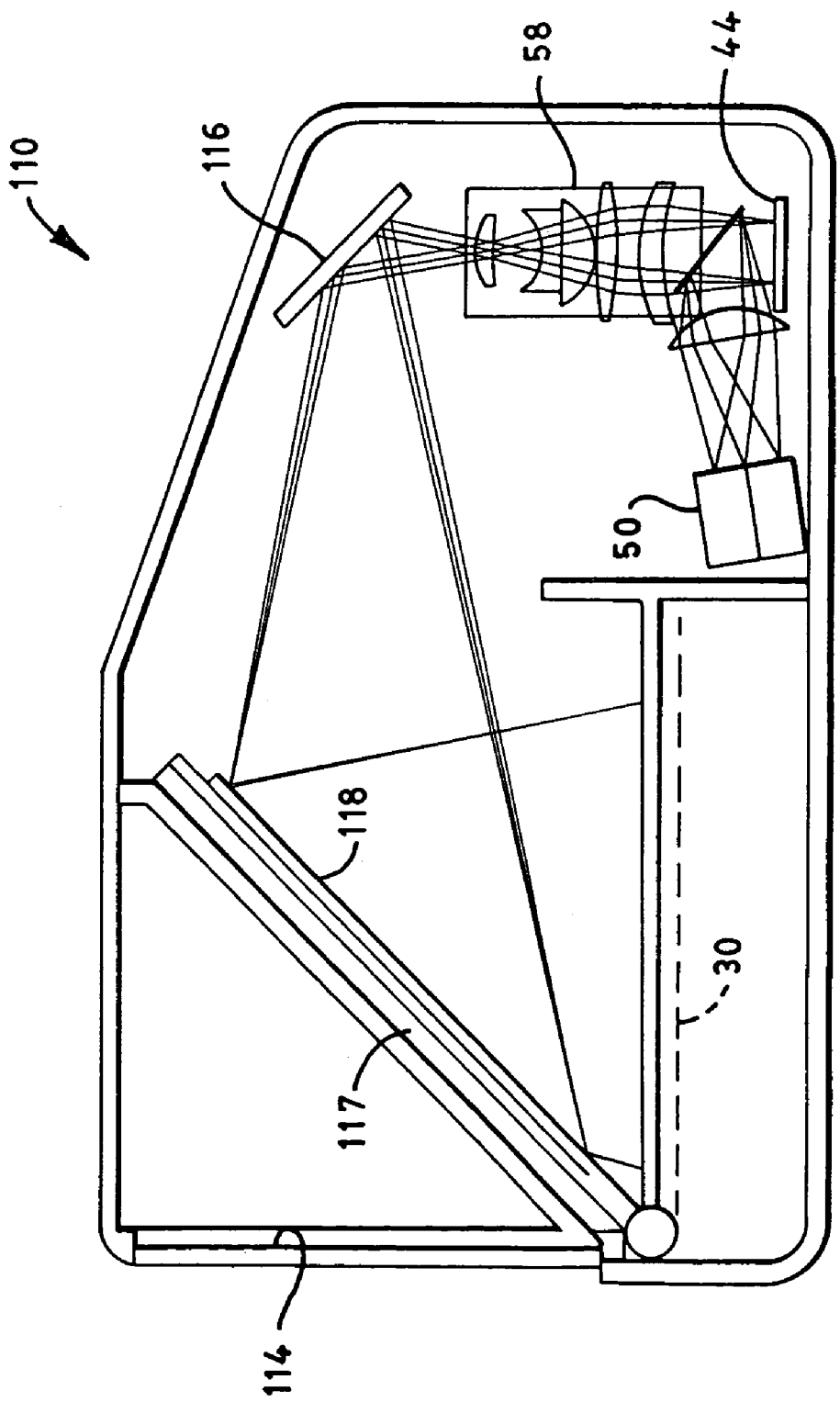
FIG. 15 illustrates the printer-projector system of FIG. 13 in its printing mode of operation.

FIGS. 13 to 15 illustrate a printer-projector system 110' made in accordance with the present invention. The printer-projector 110' of this embodiment includes a housing assembly 112 that includes a rear projection viewing screen 114 on the front wall thereof, wherein the projection optical system can display images from the mirror 116 that is fixed in place. An image display apparatus 44 is provided for displaying images thereof from the screen 114 in a viewing mode. If it is desired to print the images, the printer-projector 110' is operated to drive a rectangular dark panel 117 from a position overlying and in light-shielding relationship to the film plane, to one in light blocking relationship to the screen 114. In this latter position, the printing operation can be carried out after a second mirror 118—initially in light tight relationship over the film plane—us rauded as illustrated in FIGS. 14 and 15. When fully raised, printing is effected by projecting the images off the mirror 116 and 118 onto the film plane. To preserve the light-tight relationship with respect to the film, the mirror 118 is raised only after the dark panel 116 has achieved its light-tight relationship to the screen 114. The present invention contemplates folding of the components.

In certain embodiments of the present invention that do not require an image acquisition assembly—such as the printer-projector system 110' of FIGS. 13 to 15—means will still be required for receiving and transmitting electronic image-encoding digital information to the reflective flat panel display. In this regard, several possibilities are available. For example, the means for receiving and transmitting may comprise simply an electronic port that can be used to electronically link the reflective flat panel display of the inventive device (e.g., a standalone printer embodiment or the printer projector system 110') to an external source of digital image information (e.g., a digital still camera, digital video camera, a digital video disk player, or a personal computer). The electronic port need not establish a direct physical connection, and in fact, there would be clear advantages in certain applications to using a wireless connection (e.g., an infrared port). As another possibility, the means for receiving and transmitting may comprise the well-known readers for the aforementioned digital storage devices (e.g., readers for PCMCIA, FLASH memory, or EEPROM memory cards). Other possibilities will be readily apparent to those skilled in the art in view of the divulgations herein.

Although several specific and preferred methods and apparatus of the present invention have been shown and described above, other variations of the present invention will become apparent to those skilled in the art. The scope of the invention is therefore not limited to the specific forms shown and described.

What is claimed is:

1. A unitary electronic imaging device comprising:
   a housing;
   means for receiving and transmitting electronic image-encoding digital information;
   a reflective flat panel display capable of being electronically addressed, in response to said electronic image-encoding digital information, to provide in reflected light a reflection image;
   a reflection image viewer;
   a receptacle for holding a photosensitive imaging medium; and
   an optical system capable of selectively directing the reflection image reflected off said reflective flat panel display toward either (a) said receptacle for the image-wise area exposure of a photosensitive imaging medium held therein, or (b) said reflection image viewer for the viewing thereof by a user of the device.

2. The electronic imaging device of claim 1, wherein said means for receiving and transmitting electronic image-encoding digital information is a charge coupled device (CCD).

3. The electronic imaging device of claim 1, wherein said receptacle for holding a photosensitive medium is a receptacle for holding a cassette of self-developing photosensitive film.

4. The electronic imaging device of claim 1, wherein the reflective flat panel display is a twisted or super twisted nematic liquid crystal display.

* * * * *